United States Patent
Liu et al.

(10) Patent No.: US 10,610,978 B2
(45) Date of Patent: Apr. 7, 2020

(54) HIGH-EFFICIENT ENERGY-SAVING AND SURFACING LAYER WELL-FORMING SELF-SHIELDED FLUX-COVERED WELDING WIRE AND MANUFACTURE METHOD

(71) Applicant: JIANGSU UNIVERSITY OF SCIENCE AND TECHNOLOGY, Zhenjiang (CN)

(72) Inventors: Dashuang Liu, Zhenjiang (CN); Weimin Long, Ningbo (CN); Ping Wei, Zhenjiang (CN); Mingfang Wu, Zhenjiang (CN); Lei Zhang, Zhengzhou (CN)

(73) Assignees: JIANGSU UNIVERSITY OF SCIENCE AND TECHNOLOGY, Zhenjiang (CN); China (Ningbo) Innovation Academy of Intelligent Equipment Co., Ltd., Ningbo (CN); Zhengzhou Research Institute of Mechanical Engineering Co., Ltd., Zhengzhou (CN)

( * ) Notice: Subject to any disclaimer, the term of this patent is extended or adjusted under 35 U.S.C. 154(b) by 305 days.

(21) Appl. No.: 15/747,121

(22) PCT Filed: May 12, 2017

(86) PCT No.: PCT/CN2017/084067
§ 371 (c)(1),
(2) Date: Jan. 23, 2018

(87) PCT Pub. No.: WO2018/018997
PCT Pub. Date: Feb. 1, 2018

(65) Prior Publication Data
US 2019/0168345 A1    Jun. 6, 2019

(30) Foreign Application Priority Data

Jul. 28, 2016 (CN) .......................... 2016 1 0606623

(51) Int. Cl.
B23K 35/30 (2006.01)
B23K 35/02 (2006.01)
B23K 35/40 (2006.01)

(52) U.S. Cl.
CPC ...... *B23K 35/3053* (2013.01); *B23K 35/0244* (2013.01); *B23K 35/0266* (2013.01); *B23K 35/30* (2013.01); *B23K 35/40* (2013.01)

(58) Field of Classification Search
CPC ...... B23K 35/30; B23K 35/40; B23K 35/308; B23K 35/368; B23K 35/406; B23K 35/3053; B23K 35/0244; B23K 35/0266
See application file for complete search history.

(56) References Cited

U.S. PATENT DOCUMENTS

| | | | | |
|---|---|---|---|---|
| 3,663,313 A | * | 5/1972 | Oberly | B23K 35/3602 148/23 |
| 4,005,309 A | * | 1/1977 | Zvanut | B23K 35/308 219/145.22 |
| 4,021,637 A | * | 5/1977 | DeHaeck | B23K 35/3053 219/145.22 |

* cited by examiner

*Primary Examiner* — Brian W Jennison
(74) *Attorney, Agent, or Firm* — CBM Patent Consulting, LLC

(57) ABSTRACT

It discloses a high-efficient energy-saving and surfacing layer well-forming self-shielded flux-cored welding wire. A low-carbon steel strip is used as an outer cover, and a flux core comprises the following components in percentage by mass: 42-60% high carbon ferrochrome with a particle size of 80 meshes, 10-18% ferrosilicon, 16-25% ferroboron, 2-8% rare earth silicon, 2-8% graphite, 1-4% aluminum magnesium alloy, 2-5% manganese powder and the balance of iron powder, wherein the graphite, the aluminum magnesium alloy and the manganese powder are all added with two particle sizes including 60 meshes and 200 meshes, and the weight of the flux core powder accounts for 49-53% of the total weight of the welding wire.

9 Claims, No Drawings

HIGH-EFFICIENT ENERGY-SAVING AND SURFACING LAYER WELL-FORMING SELF-SHIELDED FLUX-COVERED WELDING WIRE AND MANUFACTURE METHOD

This application is the U.S. national phase of International Application No. PCT/CN2017/084067 filed on 12 May 2017 which designated the U.S. and claims priority to Chinese Application No. CN201610606623.2 filed on 28 Jul. 2016, the entire contents of each of which are hereby incorporated by reference.

TECHNICAL FIELD

The present invention belongs to the field of welding in materials processing engineering, and more particularly, to a high-efficient energy-saving and surfacing layer well-forming self-shielded flux-cored welding wire and manufacture method thereof.

BACKGROUND

As a green manufacturing technology, surfacing is widely applied in the repair or remanufacturing of various wear-resisting parts. The wear-resisting property of a surfacing alloy greatly depends on the additive amount of the alloy powder, i.e., the proportion of the alloy powder in the flux core. In order to increase the filing amount of the alloy powder in the flux core, our research group has developed a series of no-slag self-shielded flux-cored welding wires for surfacing in recent years. The flux core of the novel welding wire has almost no mineral powder added, so that the filling amount of the alloy is maximumly increased, thus increasing the filling coefficient of the flux-cored welding wire and effectively increasing the quantity and hardness of carbides in the surfacing alloy, which becomes one of the most potential and promising materials in the surfacing field.

However, since the content of the alloy in the flux core is too much, which usually causes overlarge surface tension of the surfacing alloy, poor mobility as well as high and narrow welding channel, the welding technology performance of the surfacing alloy is deteriorated, and the application range of the no-dreg self-protection surfacing flux-cored welding wire is limited.

SUMMARY

Object of the invention: in order to solve the technical problems in the prior art, the present invention provides a high-efficient energy-saving and surfacing layer well-forming self-shielded flux-cored welding wire and a manufacture method thereof.

Technical contents: in order to achieve the technical object above, the present invention provides a low-carbon steel strip and a flux core, wherein the flux core is filled in the steel strip, and the scope of the percentage by mass of the flux core is as follows: 42-60% high carbon ferrochrome with a particle size of 80 meshes, 10-18% ferrosilicon, 16-25% ferroboron, 2-8% rare earth silicon, 2-8% graphite, 1-4% aluminum magnesium alloy, 2-5% manganese powder and the balance of iron powder, wherein the graphite, the aluminum magnesium alloy and the manganese powder are added with two particle sizes including 60 meshes and 200 meshes, and the weight of the flux core powder accounts for 49-53% of the total weight of the welding wire.

Preferably, the carbon content of the high carbon ferrochrome is 9-10 wt %, the chrome content is 60-70 wt %, and the balance is iron; the silicon content of the ferrosilicon is 72-80 wt %, and the balance is iron; the rare earth content of the rare earth silicon is 24-27 wt %, the silicon content is 38-43 wt %, and the balance is iron; the boron content of the ferroboron is 19-25 wt %, and the balance is iron; and the aluminum content of the aluminum magnesium alloy is 47-53 wt %, and the balance is magnesium.

Preferably, the graphites with different particle sizes in the flux core includes the graphite with a particle size of 60 meshes and the graphite with a particle size of 200 meshes are added by means of combination with a mass ratio of 1:1.

Preferably, the aluminum magnesium alloys with different particle sizes in the flux core includes the aluminum magnesium alloy of with a particle size of 60 meshes and the aluminum magnesium alloy with a particle size of 200 meshes are added by means of combination with a mass ratio of 1:1.

Preferably, the manganese powders with different particle sizes in the flux core includes the manganese powder with a particle size of 60 meshes and the manganese powder with a particle size of 200 meshes are added by means of combination with a mass ratio of 1:1.

Preferably, in the flux core, the particle sizes of the components of the high carbon ferrochrome, the ferrosilicon, the ferroboron, and the iron powder in the flux core are all equal to 80 meshes.

Preferably, in the flux core, the thickness×the width of the low-carbon steel strip are equal to 0.5×21 mm.

Preferably, in the flux core, the diameter of the welding wire is any one of 2.8 mm, 3.2 rnm, 3.5 mm, 3.8 mm and 4.2 mm.

A manufacture method of the high-efficient energy-saving and surfacing layer well-forming self-shielded flux-cored welding wire above comprises the following steps of:

(1) rolling the low-carbon steel strip in a U shape by a molding roller, and then adding the flux core powder of the present invention into a U-shape groove through a powder delivery device according to 49-53% of the total weight of the welding wire of the present invention; and (2) closing the opening of the U-shape groove to cover the flux core in the U-shape groove, drawing and reducing the diameter through a wire-drawing die one by one, and finally making the diameter thereof reach 2.8-4.2 mm to obtain a final product.

The main effects of each component in the flux core are as follows.

High carbon ferrochrome: transiting an alloying element Cr into deposited metal, and providing C element.

Ferroboron and ferrosilicon: are used as self-fluxing alloying elements to effectively lower the fusing point of the welding wire, reduce the surface tension of the molten pool, improve the liquidity of the molten pool, and optimize the forming of the welding bead.

Rare earth silicon: refining the organization of the surfacing alloy through the rare earth on one hand, and siliconing and further lowering the fusing point of the welding wire on the other hand.

Graphite: providing C element, deoxidizing to form CO, and lowering the oxygen partial pressure and nitrogen partial pressure in a welding atmosphere.

Aluminum magnesium alloy: deoxidizing, fixing nitrogen, and increasing the self-protection effect.

Manganese powder: deoxidizing and increasing the self-protection effect; and transiting alloying element Mn.

It can been known from the technical solution above and the effects of each component in the flux core that by adding B, Si and other self-fluxing alloy elements simultaneously in the flux core of the invention, the fusing point of the welding wire is effectively lowered, a welding process window is expanded, the surfacing efficiency is improved, a high-efficient and energy-saving effect is realized, the surface tension of a surfacing welding bead is effectively lowered, and the forming of the surfacing welding bead is effectively improved. Experimental researches show that in a flux core component system of the flux-cored welding wire, adding 10-18% ferrosilicon with a particle size of 80 meshes, 16-25% ferroboron with a particle size of 80 meshes and 2-8% rare earth silicon with a particle size of 80 meshes at the same time has a better comprehensive effect. If the dosage is too little, the fusing point of the welding wire cannot be effectively lowered, the wettability of the molten pool and the parent metal is poor, the surface of the surfacing layer is rough without lustre, and the shaping quality of the welding bead is deteriorated; and if the dosage is too much, the crack of the surfacing alloy tends to be increased.

In addition, the graphite, the aluminum magnesium alloy and the manganese powder have two particle sizes including 60 meshes and 200 meshes, and are added by means of particle size difference combination. The whole welding process not only has a molten drop phase with extremely high temperature, but also has a molten pool phase with lower temperature, and no matter at which phase, air pollution needs to be avoided to obtain qualified welding deposited metal. The research group has found through a lot of technological tests at early phase that the components of the flux core with different particle sizes can obviously improve the self-protection effect of the welding wire. This is because that the powders of different particle sizes have different oxidative activities. Through the new idea of controlling the activity of a chemical metallurgy reaction by the particle sizes of the components, extremely-fine graphite, aluminum magnesium alloy and manganese powder with a particle size of 200 meshes are added in the flux core to conduct effective deoxidation at early phase during a welding temperature rising phase, and meanwhile, relatively rough graphite, aluminum magnesium alloy and manganese powder with a particle size of 60 meshes are added in the flux core, so that deoxidation gas making can be effectively conducted when the flux core is kept at the molten drop high-temperature phase and the molten pool phase, thus ensuring a good self-protection effect during the whole welding metallurgy process of the welding wire including heating, fusing, molten drop forming, molten drop transiting, molten pool forming and solidification, so as to realize that the welding wire can still have good welding processing property and the welding metal surface is formed in case that the welding wire is not added with any mineral slag former. Meanwhile, the addition of deoxidizing agents with multiple particle sizes ensures to obtain a good self-protection effect under the addition condition of little deoxidizing agent, and creates a spatial condition to the sufficient addition of high carbon ferrochrome, ferroboron, ferrosilicon, rare earth silicon in the formula of the flux core, etc.

Beneficial effects: by adding B, Si and other self-fluxing alloy elements simultaneously in the flux core according to the present invention, the fusing point of the welding wire is effectively lowered, the welding process window is expanded, the surfacing efficiency is improved, the high-efficient and energy-saving effect is realized, the surface tension of the surfacing welding bead is effectively lowered, and the forming of the surfacing welding bead is effectively improved. In addition, through the new idea of controlling the activity of the chemical metallurgy reaction by the particle sizes of the components, extremely-fine graphite, aluminum magnesium alloy and manganese powder with a particle size of 200 meshes and relatively rough graphite, aluminum magnesium alloy and manganese powder with a particle size of 60 meshes are added in the flux core, thus effectively ensuring a good self-protection effect during the whole welding metallurgy process of the welding wire including heating, fusing, molten drop forming, molten drop transiting, molten pool forming and solidification, so as to realize that the welding wire can still have good welding processing property in case that the welding wire is not added with any mineral slag former. The flux-cored welding wire welding technology of the present invention has good performance and high surfacing efficiency, is efficient and energy-saving, and has a beautifully formed welding bead, even surface hardness of the surfacing layer and good wear resistance.

DETAILED DESCRIPTION

The present invention can be better understood according to the following embodiments. However, the specific component ratio of the flux core, the technology condition and the result thereof described in the embodiments are only used for describing the present invention, and shall not and cannot limit the invention described in the claims in details. Wherein, the carbon content of the high carbon ferrochrome used in the following embodiments is 9-10 wt %, the chrome content is 60-70 wt %, and the balance is iron; the silicon content of the ferrosilicon is 72-80 wt %, and the balance is iron; the rare earth content of the rare earth silicon is 24-27 wt %, the silicon content is 38-43 wt %, and the balance is iron; the boron content of the ferroboron is 19-25 wt %, and the balance is iron; and the aluminum content of the aluminum magnesium alloy is 47-53 wt %, and the balance is magnesium.

First Embodiment

A high-efficient energy-saving and surfacing layer well-forming self-shielded flux-cored welding wire comprises a low-carbon steel strip and a flux core, wherein the flux core is filled in the steel strip, and the flux core is prepared according to the following mass: 60 g high carbon ferrochrome with a particle size of 80 meshes, 10 g ferrosilicon with a particle size of 80 meshes, 20 g ferroboron with a particle size of 80 meshes, 3 g rare earth silicon with a particle size of 80 meshes, 2 g graphite, 2 g aluminum magnesium alloy, 2 g manganese powder, and 1 g iron powder with a particle size of 80 meshes, wherein the graphite, the aluminum magnesium alloy and the manganese powder are added with two particle sizes including 60 meshes and 200 meshes, and for each powder added, the mass fraction with a particle size of 60 meshes and the mass fraction with a particle size of 200 meshes account for 50% respectively. All the powders are placed in a powder mixer and mixed for 40 min, and then the mixed powder is added into a U-shaped H08A carbon steel strip groove with a size of 21×0.5 mm, wherein the filing rate is 51%. Then the opening of the U-shaped groove is closed to wrap the medicinal powder therein. Then the U-shaped groove respectively passes through one or more of wire-drawing dies with diameters of 4.2 mm, 3.8 mm, 3.5 mm, 3.2 mm and 2.8 mm, and is subjected to drawing and diameter reducing one by one, to obtain a product with a diameter of 2.8-4.2 mm finally. A welding current is 280-420A, a welding voltage is 30-42V, a welding speed is 0.4 m/min, an interlayer-temperature is controlled to be 150-250° C., and three layers are surfaced. See Table 1 for the forming, the hardness and the wear resistance of the surfacing layer.

Second Embodiment

A high-efficient energy-saving and surfacing layer well-forming self-shielded flux-cored welding wire comprises a low-carbon steel strip and a flux core, wherein the flux core is filled in the steel strip, and the flux core is prepared according to the following mass: 50 g high carbon ferrochrome with a particle size of 80 meshes, 15 g ferrosilicon with a particle size of 80 meshes, 18 g ferroboron with a particle size of 80 meshes, 5 g rare earth silicon with a particle size of 80 meshes, 5 g graphite, 1 g aluminum magnesium alloy, 4 g manganese powder, and 2 g iron powder with a particle size of 80 meshes, wherein the graphite, the aluminum magnesium alloy and the manganese powder are added with two particle sizes including 60 meshes and 200 meshes, and for each powder added, the mass fraction with a particle size of 60 meshes and the mass fraction with a particle size of 200 meshes account for 50% respectively. All the powders are placed in a powder mixer and mixed for 40 min, and then the mixed powder is added into a U-shaped H08A carbon steel strip groove with a size of 21×0.5 mm, wherein the filing rate is 52%. Then the opening of the U-shaped groove is closed to wrap the medicinal powder therein. Then the U-shaped groove respectively passes through one or more of wire-drawing dies with diameters of 4.2 mm, 3.8 mm, 3.5 mm, 3.2 mm and 2.8 mm, and is subjected to drawing and diameter reducing one by one, to obtain a product with a diameter of 2.8-4.2 mm finally. A welding current is 280-420A, a welding voltage is 30-42V, a welding speed is 0.4 m/min, an interlayer-temperature is controlled to be 150-250° C., and three layers are surfaced. See Table 1 for the forming, the hardness and the wear resistance of the surfacing layer.

Third Embodiment

A high-efficient energy-saving and surfacing layer well-forming self-shielded flux-cored welding wire comprises a low-carbon steel strip and a flux core, wherein the flux core is filled in the steel strip, and the flux core is prepared according to the following mass: 42 g high carbon ferrochrome with a particle size of 80 meshes, 18 g ferrosilicon with a particle size of 80 meshes, 16 g ferroboron with a particle size of 80 meshes, 8 g rare earth silicon with a particle size of 80 meshes, 8 g graphite, 3 g aluminum magnesium alloy, 4 g manganese powder, and 1 g iron powder with a particle size of 80 meshes, wherein the graphite, the aluminum magnesium alloy and the manganese powder are added with two particle sizes including 60 meshes and 200 meshes, and for each powder added, the mass fraction with a particle size of 60 meshes and the mass fraction with a particle size of 200 meshes account for 50% respectively. All the powders are placed in a powder mixer and mixed for 40 min, and then the mixed powder is added into a U-shaped H08A carbon steel strip groove with a size of 21×0.5 mm, wherein the filing rate is 53%. Then the opening of the U-shaped groove is closed to wrap the medicinal powder therein. Then the U-shaped groove respectively passes through one or more of wire-drawing dies with diameters of 4.2 mm, 3.8 mm, 3.5 mm, 3.2 mm and 2.8 mm, and is subjected to drawing and diameter reducing one by one, to obtain a product with a diameter of 2.8-4.2 mm finally. A welding current is 280-420A, a welding voltage is 30-42V, a welding speed is 0.4 m/min, an interlayer-temperature is controlled to be 150-250° C., and three layers are surfaced. See Table 1 for the forming, the hardness and the wear resistance of the surfacing layer.

Fourth Embodiment

A high-efficient energy-saving and surfacing layer well-forming self-shielded flux-cored welding wire comprises a low-carbon steel strip and a flux core, wherein the flux core is filled in the steel strip, and the flux core is prepared according to the following mass: 48 g high carbon ferrochrome with a particle size of 80 meshes, 12 g ferrosilicon with a particle size of 80 meshes, 25 g ferroboron with a particle size of 80 meshes, 2 g rare earth silicon with a particle size of 80 meshes, 4 g graphite, 4 g aluminum magnesium alloy, and 5 g manganese powder, wherein the graphite, the aluminum magnesium alloy and the manganese powder are added with two particle sizes including 60 meshes and 200 meshes, and for each powder added, the mass fraction with a particle size of 60 meshes and the mass fraction with a particle size of 200 meshes account for 50% respectively. All the powders are placed in a powder mixer and mixed for 40 min, and then the mixed powder is added into a U-shaped H08A carbon steel strip groove with a size of 21×0.5 mm, wherein the filing rate is 49%. Then the opening of the U-shaped groove is closed to wrap the medicinal powder therein. Then the U-shaped groove respectively passes through one or more of wire-drawing dies with diameters of 4.2 mm, 3.8 mm, 3.5 mm, 3.2 mm and 2.8 mm, and is subjected to drawing and diameter reducing one by one, to obtain a product with a diameter of 2.8-4.2 mm finally. A welding current is 280-420A, a welding voltage is 30-42V, a welding speed is 0.4 m/min, an interlayer-temperature is controlled to be 150-250° C., and three layers are surfaced. See Table 1 for the forming, the hardness and the wear resistance of the surfacing layer.

The hardness listed in Table 1 uses a HR-150A Rockwell Hardometer with a loading capacity of 150 Kg, wherein the hardness of five points is taken from each test sample to calculate the average hardness value.

An MLS-225 wet-type rubber wheel abrasion tester is used in an abrasion test.

The surfacing layer of each embodiment is cut into five abrasion samples with a size of 57×25×6 mm. The parameters of the abrasion test are as follows: the diameter of a rubber wheel is 178 mm, the rotational speed of the rubber wheel is 240 r/m, the hardness of the rubber wheel is 70 (Shore hardness), the load is 10 kg, the revolution of the rubber wheel is 1000 r for pre-grinding, and the revolution for the official test is 1000 r, and the grinding material is quartz sand with a particle size of 40-70 meshes. The wear resistance of the deposited metal is measured by the loss mass of abrasion during the official test. Before and after each test, the sample is placed into a beaker filled with acetone solution to wash for 3-5 min in an ultrasonic cleaning device, and then the sample after being dried is weighted and recorded. Q235 steel is used as a reference sample in the test, the ratio of the loss mass of a reference member to the loss mass of a measurement member is used as the relative wear resistance a of the surfacing sample.

TABLE 1

Hardness and abrasion of deposited metal in each embodiment

| Embodiment | Forming of surfacing layer | Hardness/ HRC | Relative wear resistance ε |
|---|---|---|---|
| First embodiment | Bright and clean surface, no slag basically, well forming | 64.5 | 30.5 |
| Second embodiment | Bright and clean surface, no slag basically, well forming | 63.5 | 28.7 |
| Third embodiment | Bright and clean surface, no slag basically, well forming | 59.5 | 14.5 |
| Fourth embodiment | Bright and clean surface, no slag basically, well forming | 64.0 | 28.0 |

By adding B, Si and other self-fluxing alloy elements simultaneously in the flux core according to the present invention, the fusing point of the welding wire is effectively lowered, the welding process window is expanded, the surfacing efficiency is improved, the high-efficient and energy-saving effect is realized, the surface tension of the surfacing welding bead is effectively lowered, and the forming of the surfacing welding bead is effectively improved. In addition, through the new idea of controlling the activity of the chemical metallurgy reaction by the particle sizes of the components, extremely-fine graphite, aluminum magnesium alloy and manganese powder with a particle size of 200 meshes and relatively rough graphite, aluminum magnesium alloy and manganese powder with a particle size of 60 meshes are added in the flux core, thus effectively ensuring a good self-protection effect during the whole welding metallurgy process of the welding wire including heating, fusing, molten drop forming, molten drop transiting, molten pool forming and solidification, so as to realize that the welding wire can still have good welding processing property in case that the welding wire is not added with any mineral slag former. The flux-cored welding wire welding technology of the present invention has good performance and high surfacing efficiency, is efficient and energy-saving, and has a beautifully formed welding bead, even surface hardness of the surfacing layer and good wear resistance.

What is claimed is:

1. A high-efficient energy-saving and surfacing layer well-forming self-shielded flux-cored welding wire, comprising a low-carbon steel strip and a flux core, wherein the flux core is filled in the steel strip, and the scope of the percentage by mass of the flux core is as follows: 42-60% high carbon ferrochrome with a particle size of 80 meshes, 10-18% ferrosilicon, 16-25% ferroboron, 2-8% rare earth silicon, 2-8% graphite, 1-4% aluminum magnesium alloy, 2-5% manganese powder and the balance of iron powder, wherein the graphite, the aluminum magnesium alloy and the manganese powder are added with two particle sizes including 60 meshes and 200 meshes, and the weight of the flux core powder accounts for 49-53% of the total weight of the welding wire.

2. The high-efficient energy-saving and surfacing layer well-forming self-shielded flux-cored welding wire according to claim 1, wherein the carbon content of the high carbon ferrochrome is 9-10 wt %, the chrome content is 60-70 wt %, and the balance is iron; the silicon content of the ferrosilicon is 72-80 wt %, and the balance is iron; the rare earth content of the rare earth silicon is 24-27 wt %, the silicon content is 38-43 wt %, and the balance is iron; the boron content of the ferroboron is 19-25 wt %, and the balance is iron; and the aluminum content of the aluminum magnesium alloy is 47-53 wt %, and the balance is magnesium.

3. The high-efficient energy-saving and surfacing layer well-forming self-shielded flux-cored welding wire according to claim 1, wherein the graphites with different particle sizes including the graphite of 60 meshes and the graphite of 200 meshes are added by means of combination with a mass ratio of 1:1.

4. The high-efficient energy-saving and surfacing layer well-forming self-shielded flux-cored welding wire according to claim 1, wherein the aluminum magnesium alloys with different particle sizes including the aluminum magnesium alloy of 60 meshes and the aluminum magnesium alloy of 200 meshes are added by means of combination with a mass ratio of 1:1.

5. The high-efficient energy-saving and surfacing layer well-forming self-shielded flux-cored welding wire according to claim 1, wherein the manganese powders with different particle sizes including the manganese powder of 60 meshes and the manganese powder of 200 meshes are added by means of combination with a mass ratio of 1:1.

6. The high-efficient energy-saving and surfacing layer well-forming self-shielded flux-cored welding wire according to claim 1, wherein the particle sizes of the components of the high carbon ferrochrome, the high carbon ferrochrome, the ferroboron, ferrosilicon and the iron powder are all equal to 80 meshes.

7. The high-efficient energy-saving and surfacing layer well-forming self-shielded flux-cored welding wire according to claim 1, wherein the thickness×the width of the low-carbon steel strip are equal to 0.5×21 mm.

8. The high-efficient energy-saving and surfacing layer well-forming self-shielded flux-cored welding wire according to claim 1, wherein the diameter of the welding wire is any one of 2.8 mm, 3.2 rnm, 3.5 mm, 3.8 mm and 4.2 mm.

9. A manufacture method of the high-efficient energy-saving and surfacing layer well-forming self-shielded flux-cored welding wire according to claim 1, comprising the following steps of:
  (1) rolling the low-carbon steel strip in a U shape by a molding roller, and then adding the flux core powder of the present invention into a U-shape groove through a powder delivery device according to 49-53% of the total weight of the welding wire of the present invention; and
  (2) closing the opening of the U-shape groove to cover the flux core in the U-shape groove, drawing and reducing the diameter through a wire-drawing die one by one, and finally making the diameter thereof reach 2.8-4.2 mm to obtain a final product.

* * * * *